Jan. 2, 1934.  D. D. MYERS ET AL  1,941,849
WEIGHING SCALE
Filed Nov. 17, 1930
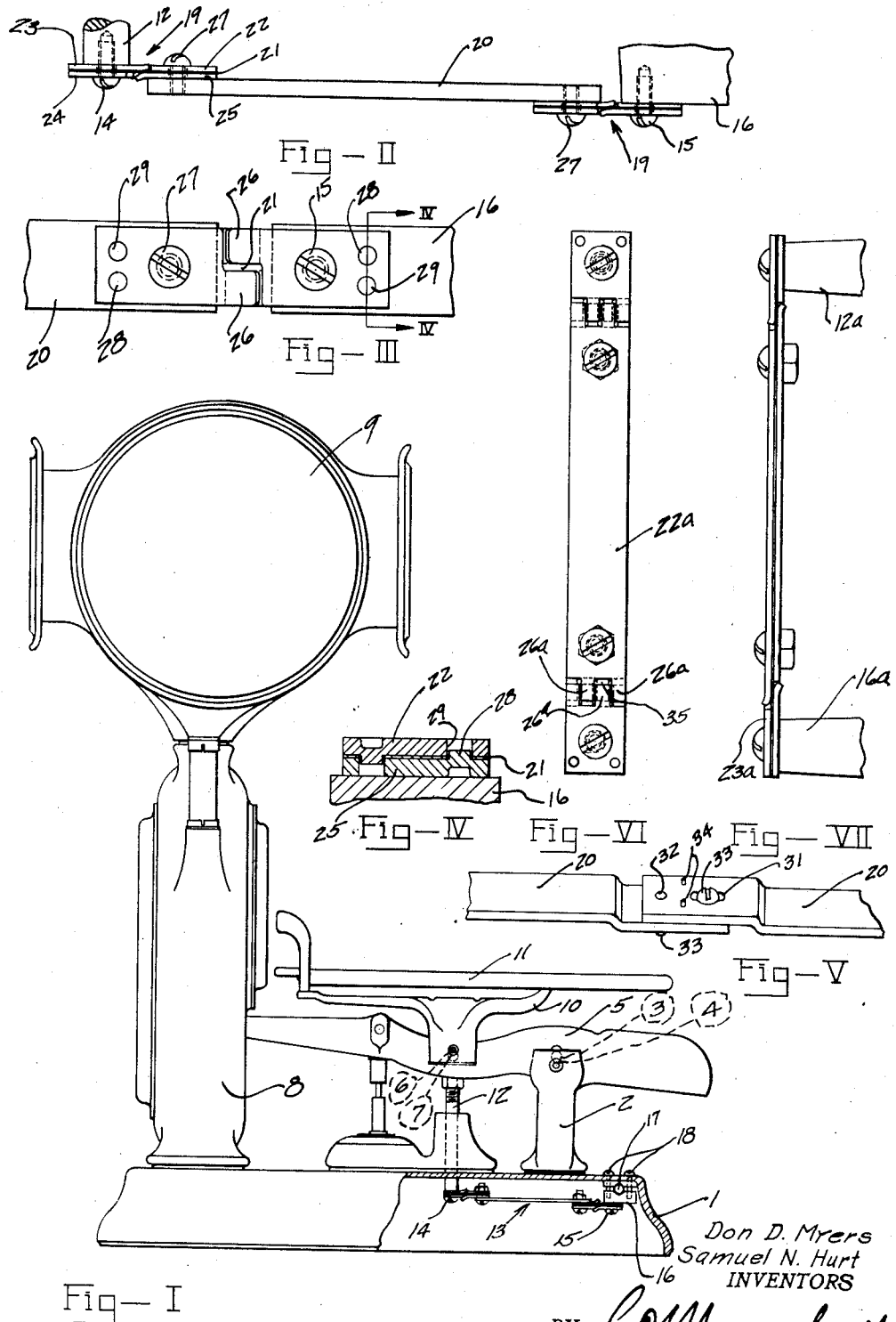
Don D. Myers
Samuel N. Hurt
INVENTORS
BY *Geo. Marshall*
ATTORNEY Patented Jan. 2, 1934

1,941,849

UNITED STATES PATENT OFFICE 1,941,849

WEIGHING SCALE

Don D. Myers and Samuel N. Hurt, Toledo, Ohio, assignors to Toledo Scale Manufacturing Company, Toledo, Ohio, a corporation of New Jersey Application November 17, 1930
Serial No. 496,086

4 Claims. (Cl. 287—92)

This invention relates to improvements in weighing scales and particularly to check stays which find manifold applications in such scales. These stays are used to parallely guide scale members to maintain the condition of level of the load receiver or to maintain a vertical position of a driving member, such as a rack. Check stays are also used to maintain the pivots of levers in correct relation with other members, as has been suggested in United States Patent No. 1,549,977 to Hem. Regardless, however, for what purpose the stay is used, its construction must insure absence of lost motion and the indestructibility of the parallelogram. Stays having joints of the so called flexure plate type are known and used. Such check stays are generally made from a piece of steel capable of being hardened and tempered and having portions, transverse the longitudinal axis, reduced in thickness to insure flexing only at those points. Stays, making use of a thin flexible steel or other metallic ribbon and reinforcing the ribbon longitudinally, with the exception at such points where the flexure is to take place, are also known. Stays made according to the method outlined in the first example are very expensive to manufacture and secondly, they are objectionable, as it is very difficult to harden and temper any two of them alike. The second class of check stays, employing the reinforced flexible ribbon, has not been successful because the ribbon at the point where it is not reinforced is very apt to kink and break in handling. In some embodiments of this type, to prevent sidewise deflections of the ribbon when being flexed, the reinforcing members are placed very closely together. This, of course, has the tendency to interfere with a free axial movement and to cause the flexure plate to assume the function of a weighing spring, which although only a slight degree, is very objectionable. When the reinforcement members are spaced far enough apart to obviate this difficulty, side-wise deflections under load are apt to take place, thus destroying the parallelogram and consequently the accuracy of the scale.

The principal object of this invention is, therefore, the provision of a check stay of the latter type having means to obviate the hereinbefore related objections.

Another object of the invention is the provision of a check stay having a thin flexible joint member and reinforcing means for said joint.

A further object is the provision of means for obviating the thrust components in a check stay of the type hereinafter described.

Still another object is the provision of means whereby the distance between the axes of deflection of a check stay may be adjusted to accurately correspond to another distance.

A still further object is the provision of means whereby standard flexure members, may be used in building check stays of any length.

These and other advantages will be apparent from the following description in which reference is had to the accompanying drawing and in which similar reference numerals designate similar parts throughout the several views.

In the drawing:—

Figure I is a side elevational view, a portion broken away, of a scale employing an embodiment of our invention to maintain the condition of level of the load receiver.

Figure II is an enlarged side elevational view of a check stay embodying our invention and showing fragments of the members to which it is attached.

Figure III is an enlarged plan view of a flexible check stay joint embodying one invention showing the reinforcing plates in detail.

Figure IV is an enlarged cross sectional view taken substantially along the line IV—IV of Figure III.

Figure V is an enlarged fragmentary view in perspective showing an adjustment of the stay plate.

Figures VI and VII illustrate the embodiment of a modification of our invention.

Referring to the drawing in detail, a base 1, usually a rigid iron casting, supports a base horn 2 which is provided with suitable bearings (not shown) in its upper ends in which are mounted the fulcrum pivots 3 and 4 of a load supporting lever 5. This lever is also provided with a pair of load pivots 6 and 7 which are in spaced relation with the fulcrum pivots 3 and 4. The nose portion of the lever 5 extends into the housing 8 and is connected to the load counterbalancing mechanism (not shown) located therein and to the indicating mechanism (not shown) within the casing 9 mounted upon the housing. A load receiving spider 10, supporting a load receiver 11, rests by means of suitable bearings (not shown), on the load pivots 6 and 7 and any load placed on the load receiver acts through the lever 5 on the counterbalancing and indicating mechanisms.

For the purpose of maintaining the condition of level of the load receiver, the spider 10 has a depending stem 12 which projects downwardly into the hollow portion of the base 1. A check stay 13 is secured at one of its ends by means of the screw 14 to the stem 12 and the other end is fastened by the screw 15 to an adjustable block 16. This block is fulcrumed on a cylindrical member 17 which rests in a groove in the block 16 and also in a groove a stationary boss of the base 1 and is adapted to be adjusted by the two screws 18 projecting through the top of the base 1. The purpose of this adjustment is to form a true parallelogram in which a line drawn through the axes of flexure of the check stay 13 and a line which touches the edges of the fulcrum pivots 3 and 4 and the load pivots 6 and 7 form two of the sides.

The check stay 13 is substantially shown in Figure II and consists of two flexible joints 19 and a rigid plate 20 to which the joints are fastened by means of the screws 27. Scales of the type herein described and illustrated are built with various weighing capacities. This necessitates that the distance between the fulcrum pivots 3 and 4 and the load pivots 6 and 7 be in proportion to the weighing capacity of the scale, that is, with a light capacity, the distance is increased, and with a comparatively heavy capacity the distance is shortened so that the force resulting from a load placed on the load receiver 11 at the nose of the lever where it connects on to the counterbalancing mechanism, is relatively the same.

As the distance between the axes of flexure must be exactly that of the pivots, it will be readily seen that the construction of the check stay so far described has a universal use in as much as any length of check stay can be constructed by simply changing the length of the stay plate 20. The flexible joint 19 comprises a thin flexible member 21 which is usually a highly tempered metallic ribbon, although small plates of other material notably of some forms of synthetic resin having a high elasticity may be used when the angular movement of the member to be checked is small. This thin member 21 is suitably reinforced and constrained to flex only on predetermined axes by the reinforcing plates 22, 23, 24 and 25 which for the purpose of preventing sidewise flexing or kinking, in the form of the device as shown, are provided with offset overlapping projections 26. The plates 22, 23, 24 and 25 are all similar and when assembled as shown in Figure II, the projections 26, which are also curved to insure free movement, overlap each other and as two of the plates 22 and 23 are on one side of the flexible member 21 and two plates 24 and 25 are below, it will be seen that sidewise deflection resulting in the destruction of the parallelogram is entirely obviated. When a force, which tends towards this result is set up, the projections on one side of the flexible member 21 will contact the projections on the plates on the other side through the ribbon and thus prevent the ribbon from flexing at any other than the predetermined axis. This action does not cause friction which is detrimental to the accuracy of the scale.

To properly align the reinforcing plates and the flexible member 21, the plates which are all similar, have a small boss 28 punched beyond their surfaces to form projections and also have an aperture 29 punched through them. The distance between the projections and the apertures is such that when the plates 22 and 25 are placed on each other the bosses 28 of the plates 22 and 25 will project into the corresponding apertures 29 of the same plates on either side of the flexible member 21 and as the flexible member 22 also has corresponding apertures the bosses pass through these and thus prevent displacement. It will be seen that when the plates 23 and 24 are placed on the other end of the flexible member 21, the axis of deflection must be right angles to the longitudinal axis of the assembly.

It is sometimes desirable to make a slight adjustment of the distance between the flexure axes of the check stay 13. This is easily accomplished, as is illustrated in Figure V by making the check plate 20 in two parts, offsetting ends so that when assembled, the other ends of the plates 22 are in the same plane. Each of the offset ends is provided with an elongated slot 31 and a threaded aperture 32. The screws 33, being adapted to pass through the elongated slot into the threaded aperture of the other half of the plate 20 which permits a slight adjustment of the length. When the proper adjustment has been made and the screws 33 tightened, the position may be fixed by drilling and inserting the pins 34.

A modified form of the device is shown in Figures VI and VII. In this embodiment the reinforcing plate 22a is provided with a plurality of curved projections 26a. These form interstices 35 into which the projections 26a of the reinforcing plate 23a are adapted to freely enter, thus forming similar overlaps as disclosed in the description of the flexible joint 19. Stays of this type are designed for heavier duty scales. Although the check stay illustrated in Figures VI and VII is shown as a single purpose stay, that is, the distance between the axes of flexure is fixed it will be readily seen that the flexible joints 19 may be similarly provided with a plurality of projections and interstices.

The embodiment of our invention herein shown and described is to be regarded as illustrative only, and it is to be understood that the invention is susceptible to variation, modification and change within the spirit and scope of the subjoined claims.

Having described our invention, we claim:

1. A joint comprising a thin flexible member and rigid reinforcing members secured to said flexible member, said reinforcing members having interdigitated projections overlying a zone of flexure of said flexible member.

2. A joint comprising a thin flexible member and rigid reinforcing members secured to said flexible member, said reinforcing members having outwardly curved interdigitated projections overlying a zone of flexure of said flexible members and said outwardly curved projections being adapted to hold similar projections and be held thereby against all but axial movement.

3. A flexible joint for a scale stay comprising a thin flexible member, a plurality of inflexible reinforcing members having curved interdigitated projections overlying a zone of flexure and adapted to roll on each other when said joint is flexed.

4. In a scale stay, a joint comprising a thin flexible member and rigid reinforcing members secured to said flexible member, said reinforcing members having interdigitated projections overlying a zone of flexure of said flexible member and each of said reinforcing members having a boss projecting from one of its faces and an aperture at right angles to its longitudinal axis, said flexible member having a plurality of apertures and each of said bosses on said reinforcing members being adapted to pass through an aperture in said flexible member into an aperture in another of said reinforcing members.

DON D. MYERS.
SAMUEL N. HURT.